United States Patent
Vijaya Kumar et al.

(10) Patent No.: US 12,110,024 B2
(45) Date of Patent: Oct. 8, 2024

(54) CONSIDERATION OF ACCELERATION LAG IN LEAD VEHICLE TO ENHANCE HOST VEHICLE OPERATION

(71) Applicant: GM Global Technology Operations LLC, Detroit, MI (US)

(72) Inventors: Vivek Vijaya Kumar, Shelby Township, MI (US); Kausalya Singuru, Troy, MI (US); Kevin A. O'Dea, Ann Arbor, MI (US); Carl P. Darukhanavala, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 17/136,580

(22) Filed: Dec. 29, 2020

(65) Prior Publication Data
US 2022/0203984 A1 Jun. 30, 2022

(51) Int. Cl.
*B60W 30/16* (2020.01)
*B60W 60/00* (2020.01)

(52) U.S. Cl.
CPC ........ *B60W 30/162* (2013.01); *B60W 60/001* (2020.02); *B60W 2420/403* (2013.01); *B60W 2420/408* (2024.01); *B60W 2554/404* (2020.02); *B60W 2554/802* (2020.02)

(58) Field of Classification Search
CPC ............. B60W 30/162; B60W 60/001; B60W 2554/404; B60W 2554/802; B60W 2420/42; B60W 2420/52
See application file for complete search history.

(56) References Cited

U.S. PATENT DOCUMENTS

| | | | |
|---|---|---|---|
| 2004/0158383 A1* | 8/2004 | Sen | B60K 31/0008 701/96 |
| 2013/0144465 A1* | 6/2013 | Shida | B60T 7/22 701/1 |
| 2016/0200320 A1* | 7/2016 | Nemoto | B60W 30/16 701/96 |

(Continued)

OTHER PUBLICATIONS

Kesting et al., "Extending Adaptive Cruise Control to Adaptive Driving Strategies", Journal of the Transportation Research Board, Jan. 2007, pp. 16-24.

*Primary Examiner* — Jelani A Smith
*Assistant Examiner* — Toya Pettiegrew
(74) *Attorney, Agent, or Firm* — CANTOR COLBURN LLP

(57) ABSTRACT

A method includes obtaining information about a lead vehicle. The lead vehicle is traveling directly ahead of the host vehicle and the information includes velocity of the lead vehicle and a gap g between the host vehicle and the lead vehicle. Based on detecting a change in the velocity of the lead vehicle in the information, a corresponding desired acceleration is computed for the host vehicle using perceived acceleration of the lead vehicle to maintain the gap g within a specified range of gap values. The perceived acceleration of the lead vehicle is based on the change in the velocity indicated by the information. Based on a check of parameters involved in the computing the corresponding desired acceleration, a modified desired acceleration is computed for the host vehicle using a lag for the lead vehicle that results in an intended acceleration of the lead vehicle differing from the perceived acceleration.

20 Claims, 2 Drawing Sheets

(56) References Cited

U.S. PATENT DOCUMENTS

| | | | |
|---|---|---|---|
| 2017/0072953 A1* | 3/2017 | Nemoto | B60W 30/16 |
| 2019/0143971 A1* | 5/2019 | Makled | G08G 1/096725 |
| | | | 701/96 |
| 2019/0232964 A1* | 8/2019 | Lindholm | G06V 20/58 |
| 2019/0391259 A1* | 12/2019 | Shimizu | B60W 30/16 |
| 2022/0089155 A1* | 3/2022 | Shimizu | B60W 40/10 |
| 2022/0111734 A1* | 4/2022 | Sim | B60L 3/0015 |
| 2022/0185279 A1* | 6/2022 | Takahama | B60W 30/14 |

* cited by examiner

CONSIDERATION OF ACCELERATION LAG IN LEAD VEHICLE TO ENHANCE HOST VEHICLE OPERATION

INTRODUCTION

The subject disclosure relates to consideration of acceleration lag in a lead vehicle to enhance host vehicle operation.

Vehicles (e.g., automobiles, trucks, construction equipment, automated factory equipment) employ sensors to perform semi-autonomous or autonomous operation. Exemplary sensors (e.g., camera, radar system, lidar system, inertial measurement unit, accelerometer) provide information about the vehicle and its surroundings. Exemplary semi-autonomous operations include adaptive cruise control (ACC) and collision avoidance. ACC is a driver assistance system that maintains a driver-specified speed for the host vehicle (i.e., the vehicle implementing the ACC system) while adjusting that speed, as needed, to maintain a distance from a lead vehicle (i.e., a vehicle directly ahead of the host vehicle). A collision avoidance system autonomously applies the brakes of a host vehicle to avoid a collision with a lead vehicle. Autonomous vehicles include both ACC and collision avoidance functionalities. Prior approaches to systems in autonomous and semi-autonomous vehicles that mitigate frontal collisions are reactionary. That is, the vehicle reacts to detected changes in speed or range rate of a lead vehicle. Accordingly, it is desirable to provide consideration of acceleration lag in a lead vehicle to enhance host vehicle operation.

SUMMARY

In one exemplary embodiment, a method includes obtaining, by processing circuitry of a host vehicle, information about a lead vehicle. The lead vehicle is traveling directly ahead of the host vehicle and the information includes velocity of the lead vehicle and a gap g between the host vehicle and the lead vehicle. The method also includes computing, using the processing circuitry, based on detecting a change in the velocity of the lead vehicle in the information, a corresponding desired acceleration for the host vehicle using a perceived acceleration of the lead vehicle to maintain the gap g within a specified range of gap values. The perceived acceleration of the lead vehicle is based on the change in the velocity indicated by the information. Based on a check of parameters involved in the computing the corresponding desired acceleration, a modified desired acceleration is computed for the host vehicle using a lag for the lead vehicle that results in an intended acceleration of the lead vehicle differing from the perceived acceleration. The modified desired acceleration is implemented for the host vehicle.

In addition to one or more of the features described herein, the obtaining the information about the lead vehicle includes obtaining measured velocity of the lead vehicle using a sensor, and the sensor includes a radar system, a lidar system, or a camera.

In addition to one or more of the features described herein, the computing the corresponding desired acceleration for the host vehicle includes determining a desired gap $g^*$ as:

$$g^* = g_0 + \max\left[0, \left(\vartheta_H T + \left(\frac{\vartheta_H \Delta \vartheta}{2\sqrt{a_H b}}\right)\right)\right],$$

where
$g_0$ is a set minimum gap value, $\vartheta_H$ is a current velocity of the host vehicle, T is a known constant related to a time associated with a safe gap, $\Delta\vartheta$ is a difference between a current velocity $\vartheta_L$ of the lead vehicle and the current velocity $\vartheta_H$ of the host vehicle, $a_H$ is a current acceleration of the host vehicle, and b is a known constant that limits deceleration.

In addition to one or more of the features described herein, performing the check of parameters includes determining if the desired gap $g^*$ is within the specified range of gap values, wherein the computing the modified desired acceleration is not performed if the desired gap $g^*$ is within the specified range of gap values.

In addition to one or more of the features described herein, the computing the corresponding desired acceleration for the host vehicle includes determining the desired acceleration $\dot{\vartheta}_H(t)$ for the host vehicle as:

$$\dot{\vartheta}_H(t) = a_H\left(1 - \left(\frac{\vartheta_H}{\vartheta_{Hf}}\right)^\delta\right) - a_H\left(\left(\frac{g^*(\vartheta_H \Delta\vartheta)}{g}\right)^2\right),$$

where
$\vartheta_{Hf}$ is a final velocity of the host vehicle needed to achieve the desired gap $g^*$, and g is a current gap.

In addition to one or more of the features described herein, the performing the check of parameters includes determining if a difference between a current acceleration of the host vehicle and the corresponding desired acceleration is within a specified range.

In addition to one or more of the features described herein, the modified desired acceleration of the host vehicle is computed using:

$$a_{est} = \dot{\vartheta}_H(t)(1 - e^{(t-\varphi)\tau}), \text{ where}$$

lag time constant $\tau$ and delay constant $\varphi$ are obtained from a look-up table for a type of the lead vehicle.

In addition to one or more of the features described herein, the modified desired acceleration of the host vehicle is computed by adding one or more model-based factors to $a_{est}$.

In addition to one or more of the features described herein, the model-based factors include an acceleration factor statistical model of slowdown of the lead vehicle and a smoothness factor.

In addition to one or more of the features described herein, the method also includes updating the look-up table for the type of the lead vehicle based on a result of the implementing the new corresponding desired acceleration for the host vehicle.

In another exemplary embodiment, a system in a host vehicle includes one or more sensors to provide information about a lead vehicle. The lead vehicle is traveling directly ahead of the host vehicle and the information includes velocity of the lead vehicle and a gap g between the host vehicle and the lead vehicle. The system also includes a controller to compute, based on detecting a change in the velocity of the lead vehicle in the information, a corresponding desired acceleration for the host vehicle using a perceived acceleration of the lead vehicle to maintain the gap g within a specified range of gap values. The perceived acceleration of the lead vehicle is based on the change in the velocity indicated by the information. Based on a check of parameters involved in the computing the corresponding desired acceleration, a modified desired acceleration is computed for the host vehicle using a lag for the lead vehicle that results in an intended acceleration of the lead vehicle differing from the perceived acceleration. The modified desired acceleration is implemented in the host vehicle.

I In addition to one or more of the features described herein, the one or more sensors include a radar system, a lidar system, or a camera.

In addition to one or more of the features described herein, the controller computes the corresponding desired acceleration for the host vehicle by determining a desired gap g* as:

$$g^* = g_0 + \max\left[0, \left(\vartheta_H T + \left(\frac{\vartheta_H \Delta \vartheta}{2\sqrt{a_H b}}\right)\right)\right],$$

where
$g_0$ is a set minimum gap value, $\vartheta_H$ is a current velocity of the host vehicle, T is a known constant related to a time associated with a safe gap, $\Delta\vartheta$ is a difference between a current velocity $\vartheta_L$ of the lead vehicle and the current velocity $\vartheta_H$ of the host vehicle, $a_H$ is a current acceleration of the host vehicle, and b is a known constant that limits deceleration.

In addition to one or more of the features described herein, the controller performs the check of parameters by determining if the desired gap g* is within the specified range of gap values, wherein the computing the modified desired acceleration is not performed if the desired gap g* is within the specified range of gap values.

In addition to one or more of the features described herein, the controller computes the corresponding desired acceleration for the host vehicle by determining the desired acceleration $\vartheta_H(t)$ for the host vehicle as:

$$\vartheta_H(t) = a_H\left(1 - \left(\frac{\vartheta_H}{\vartheta_{Hf}}\right)^\delta\right) - a_H\left(\left(\frac{g^*(\vartheta_H \Delta \vartheta)}{g}\right)^2\right),$$

where
$\vartheta_{Hf}$ is a final velocity of the host vehicle needed to achieve the desired gap g*, and g is a current gap.

In addition to one or more of the features described herein, the controller performs the check of parameters by determining if a difference between a current acceleration of the host vehicle and the corresponding desired acceleration is within a specified range.

In addition to one or more of the features described herein, the controller computes the modified desired acceleration of the host vehicle as:

$a_{est} = \vartheta_H(t)(1 - e^{(t-\varphi)/\tau})$, where lag time constant $\tau$ and delay constant $\varphi$ are obtained from a look-up table for a type of the lead vehicle.

In addition to one or more of the features described herein, the controller computes the modified desired acceleration of the host vehicle by adding one or more model-based factors.

In addition to one or more of the features described herein, the model-based factors include an acceleration factor statistical model of slowdown of the lead vehicle and a smoothness factor.

In addition to one or more of the features described herein, the controller updates the look-up table for the type of the lead vehicle based on a result of implementing the new corresponding desired acceleration for the host vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
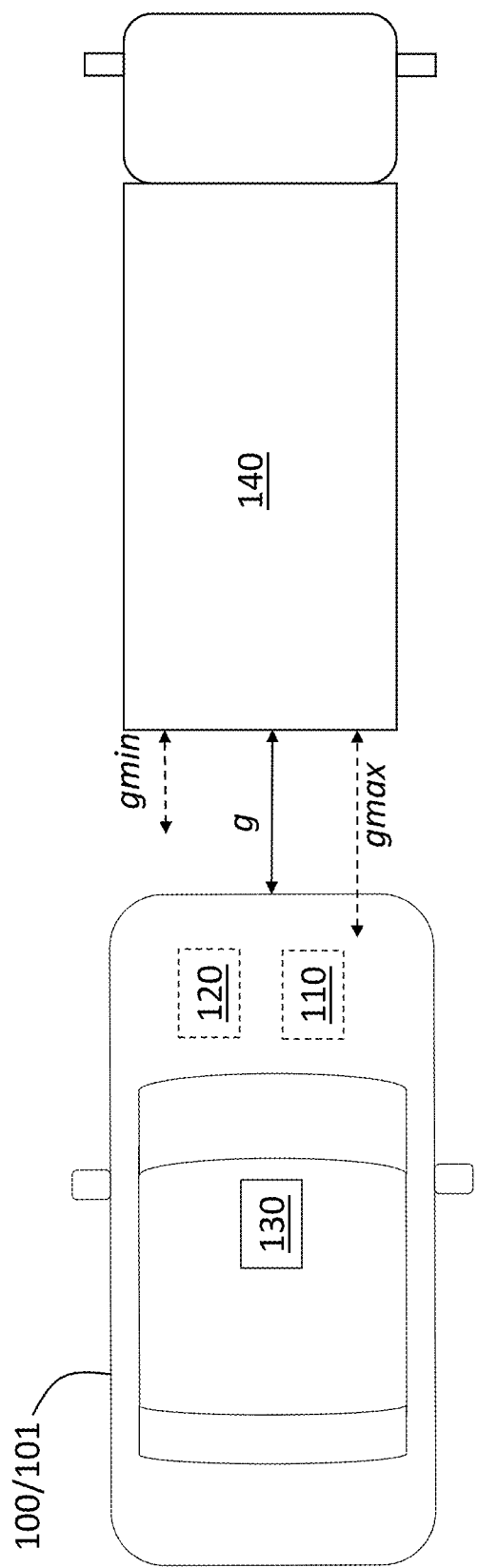
FIG. 1 is a block diagram illustrating an exemplary scenario involving an estimate of an actual acceleration of a lead vehicle to enhance operation of a host vehicle according to one or more embodiments.

The following description is merely exemplary in nature and is not intended to limit the present disclosure, its application or uses. It should be understood that throughout the drawings, corresponding reference numerals indicate like or corresponding parts and features.

As previously noted, systems to perform semi-autonomous and autonomous operation of a host vehicle use various sensors. Systems such as the ACC and collision avoidance systems, for example, require detecting the relative position and acceleration of a lead vehicle. Acceleration is the time rate of change of velocity and can result in either an increase or decrease in speed. Deceleration, in particular, is an acceleration that causes a reduction in speed. The perceived or measured acceleration of the lead vehicle may be inaccurate due to lag in the response of the lead vehicle. That is, the ultimate (i.e., intended) acceleration that is commanded in the lead vehicle by a driver or controller may not accurately be reflected in the pre-lag perceived (i.e., measured) acceleration. The lag between a signal (e.g., driver depressing brake or gas pedal), which results in the perceived acceleration that is initially measured by the host vehicle, and the intended final velocity of the lead vehicle based on the actuation signal may vary based on the type of the lead vehicle.

Because of this lag associated with a given lead vehicle, the semi-autonomous or autonomous operation of the host vehicle that is based on reacting to the perceived acceleration (i.e., change in measured or sensed velocity) may cause the host vehicle to operate in a way that the gap between the host vehicle and the lead vehicle increases or decreases beyond an acceptable range of distances. As a consequence, sudden acceleration or braking may have to be implemented in the host vehicle, creating an uncomfortable ride for the passengers of the host vehicle. Embodiments of the systems and methods detailed herein relate to the consideration of acceleration lag in a lead vehicle to enhance host vehicle operation. Specifically, a more accurate desired acceleration of the host vehicle may be determined by considering the lag that makes intended acceleration of the lead vehicle differ from the perceived acceleration of the lead vehicle.

In accordance with an exemplary embodiment, FIG. 1 is a block diagram illustrating an exemplary scenario involving consideration of acceleration lag in a lead vehicle 140 to enhance operation of a host vehicle 100. The exemplary host vehicle 100 shown in FIG. 1 is an automobile 101. The exemplary lead vehicle 140 is a truck. A gap g between the host vehicle 100 and the lead vehicle 140 is indicated. This gap g is within an acceptable range defined by a minimum gap gmin and a maximum gap gmax, as also indicated. The host vehicle 100 includes sensors 120 that obtain information about the host vehicle 100 and sensors 130 that obtain information about its environment, including the presence, position, and acceleration of the lead vehicle 140.

The host vehicle 100 also includes a controller 110 that obtains information from the sensors 120, 130 and controls semi-autonomous or autonomous operation of the vehicle 100. This operation may include control of the ACC or collision avoidance systems. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
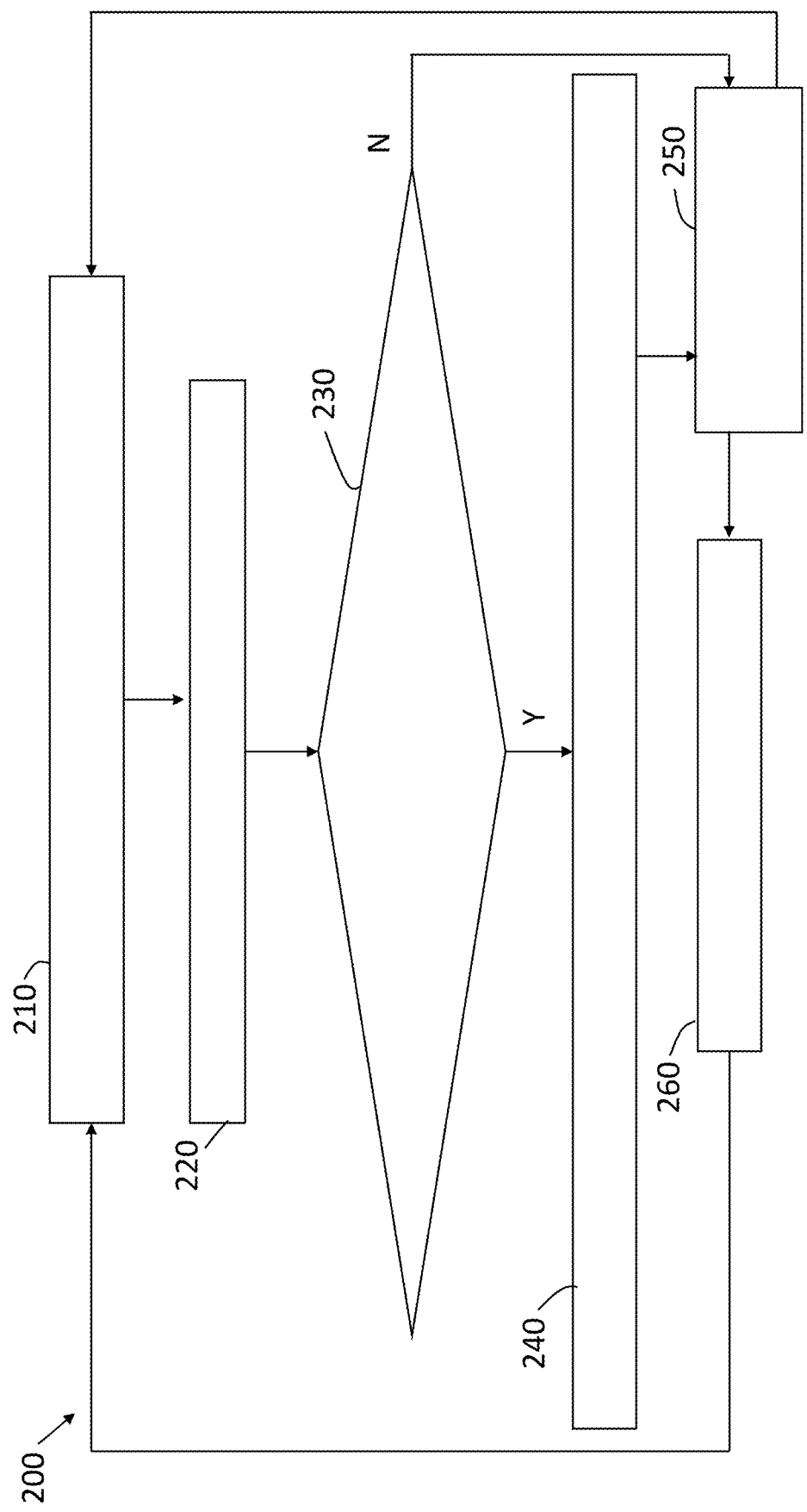
FIG. 2 is a process flow of a method of enhancing operation of a host vehicle by estimating an actual acceleration of a lead vehicle according to one or more embodiments.

FIG. 2 is a process flow of a method 200 of enhancing operation of a host vehicle 100 by considering acceleration lag in a lead vehicle 140 according to one or more embodiments. The processes may be performed by the controller 110 of the host vehicle 100. At block 210, obtaining the type, acceleration, velocity, and position of the lead vehicle 140 includes using the sensors 130 (e.g., lidar system, radar system, camera) according to known techniques. The type of the lead vehicle 140 (e.g., small car, truck) facilitates using a look-up table to obtain lag time constants $\tau_{acc}$ (acceleration lag) and $\tau_{dec}$ (deceleration lag) and delay constants $\varphi_{acc}$ (acceleration lag) and $\varphi_{dec}$ (deceleration lag). As further discussed with reference to block 240, the relevant look-up table values may be accessed as part of the prediction. The process at block 210 is performed continuously. When a change in velocity (i.e., an acceleration) is perceived (i.e., measured) for the lead vehicle 140, then the method 200 proceeds to block 220.

At block 220, calculating a desired acceleration $\dot{\vartheta}_H(t)$ for the host vehicle 100 refers to determining the acceleration that is perceived to be needed to maintain the gap g between the range defined by the minimum gap gmin and a maximum gap gmax based on the observed actions of the lead vehicle 140. This is calculated based on EQS. 1 and 2:

$$g^* = g_0 + \max\left[0, \left(\vartheta_H T + \left(\frac{\vartheta_H \Delta \vartheta}{2\sqrt{a_H b}}\right)\right)\right] \qquad \text{[EQ. 1]}$$

$$\dot{\vartheta}_H(t) = a_H\left(1 - \left(\frac{\vartheta_H}{\vartheta_{Hf}}\right)^\delta\right) - a_H\left(\left(\frac{g^*(\vartheta_H \Delta \vartheta)}{g}\right)^2\right) \qquad \text{[EQ. 2]}$$

In EQ. 1, g* is the desired gap g, which is within the range defined by the minimum gap gmin and a maximum gap gmax. The minimum gap $g_0$ is a setting (e.g., of the ACC system) that specifies the minimum gap preference of the operator, for example. The current velocity $\vartheta_H$ of the host vehicle 100 is known based on sensors 120, for example, and T is a known constant that is based on a traffic model. The constant T represents a time associated with a safe gap value and is used because the desired gap g* is affected by the traffic model (e.g., desired g* may be decreased with more traffic density). The difference $\Delta\vartheta$ is the difference between the current velocity $\vartheta_L$ of the lead vehicle 140, determined according to sensors 130, and current velocity of the host vehicle 100. The current acceleration $a_H$ of the host vehicle 100 is known based on sensors 120 of the host vehicle 100, and b is a deceleration constant that limits deceleration in braking scenarios. The free acceleration component δ is known.

As EQ. 2 indicates, the desired acceleration $\dot{\vartheta}_H(t)$ for the host vehicle 100 is calculated using the perceived (i.e., measured) velocity $\vartheta_L$ of the lead vehicle 140 (as part of the difference $\Delta\vartheta$). The final velocity $\vartheta_{Hf}$ of the host vehicle 100 is what is needed to achieve the desired gap g* in view of the final velocity of the lead vehicle 140. The final velocity $\vartheta_{Hf}$ of the host vehicle 100 is based on the perceived velocity $\vartheta_L$ of the lead vehicle 140, because the lag (i.e., the potential for a subsequent further increase in rate of change of velocity) is not considered in EQ. 2. As previously noted, this computation of the desired acceleration $\dot{\vartheta}_H(t)$ for the host vehicle 100 (and the final velocity $\vartheta_{Hf}$) may be inaccurate because of the lag between the perceived and intended accelerations of the lead vehicle 140. Thus, before this desired acceleration $\dot{\vartheta}_H(t)$ for the host vehicle 100 is implemented, the check at block 230 is performed.

At block 230, a check is done with the two parameters obtained with EQS. 1 and 2. One check determines if the desired gap g* resulting from EQ. 1 is outside the threshold range defined by the minimum gap gmin and maximum gap gmax. Another check is whether an acceleration difference between the desired acceleration $\dot{\vartheta}_H(t)$ for the host vehicle 100 (computed according to EQ. 2 at block 220) and the current acceleration of the host vehicle 100 is outside a threshold acceleration difference range. Because the lead vehicle 140 may be slowing or speeding up, the computed desired acceleration $\dot{\vartheta}_H(t)$ for the host vehicle 100 and, thus, the acceleration difference, may be an increase or a decrease. The minimum gap gmin and maximum gap gmax, as well as the threshold acceleration difference, may be adjusted based on the traffic model.

Based on the check at block 230, intended acceleration of the lead vehicle 140 may or may not need to be considered. If both the desired gap g* and the acceleration difference are within the threshold ranges (according to the check at block 230), then the control of the host vehicle in block 250 is performed using computed desired acceleration $\dot{\vartheta}_H(t)$. Then, the processes beginning at block 210 are resumed. If the desired gap g* and the acceleration difference are outside the threshold ranges (according to the check at block 230), then the processes at block 240 are performed.

At block 240, obtaining a modified desired acceleration $a_{est}$ for the host vehicle 100 implicates a prediction of the intended acceleration of the lead vehicle 140. That is, instead of using the computed desired acceleration $\dot{\vartheta}_H(t)$ (using EQ. 2), the modified desired acceleration $a_{est}$ is instead computed for the host vehicle 100. By taking into account the lag for the type of the lead vehicle 140, the computation of modified desired acceleration $a_{est}$ for the host vehicle 100 considers the intended acceleration of the lead vehicle 140 rather than the perceived acceleration. To be clear, the intended acceleration of the lead vehicle 140 is what would be perceived after the lag associated with the lead vehicle 140.

As previously noted, the relevant lag time constant t and the delay constant φ corresponding with the type of the lead vehicle 140 (e.g., truck, compact car) may be obtained from a look-up table as part of the prediction at block 240 or previously (e.g., at block 210). That is, the look-up table may provide values of $\tau_{acc}$, $\tau_{dec}$, $\varphi_{acc}$, and $\varphi_{dec}$ for each of several types of vehicles. As discussed with reference to block 260, the look-up table entry for the type of vehicle that matches the lead vehicle 140 may be updated (at block 260) for use the next time the host vehicle 100 encounters a lead vehicle 140 of that same type and the controller 110 performs the processing at block 240.

Specifically, at block 240, the modified desired acceleration $a_{est}$ for the host vehicle 100 is computed using EQ. 3:

$$a_{est} = \dot{\vartheta}_H(t)(1 - e^{(t-\varphi)\tau}) + r\_factor + f\_factor \quad [EQ. 3]$$

In EQ. 3, the desired acceleration $\dot{\vartheta}_H(t)$ for the host vehicle 100 (from block 220) is the computation result using EQ. 2, which did not consider any lag associated with the lead vehicle 140. The lag time constant $\tau$ is $\tau_{acc}$ (if the acceleration $a_L$ of the lead vehicle 140 results in increased velocity $\vartheta_L$ of the lead vehicle 140) or $\tau_{dec}$ (if the acceleration $a_L$ of the lead vehicle 140 results in decreased velocity $\vartheta_L$ of the lead vehicle 140). Similarly the delay constant $\varphi$ is $\varphi_{acc}$ (if the acceleration $a_L$ of the lead vehicle 140 results in increased velocity $\vartheta_L$ of the lead vehicle 140) or $\varphi_{dec}$ (if the acceleration $a_L$ of the lead vehicle 140 results in decreased velocity $\vartheta_L$ of the lead vehicle 140). The additional components in EQ. 3, r_factor and f_factor, are optional. The r_factor, which is the acceleration factor statistical model of slowdown of the lead vehicle 140, may be obtained from a model and is a function of the perceived acceleration of the lead vehicle 140. The f_factor, which is the factor for smoothness, is based on previously computed calibrations that account for passenger comfort and is a function of the difference $\Delta\vartheta$.

After the modified desired acceleration $a_{est}$ is computed according to EQ. 3 (at block 240), the processes at block 250 are reached. When block 250 is reached from block 240, operation of the host vehicle 100 is controlled based on the modified desired acceleration $a_{est}$ computed according to EQ. 3 in consideration of lag associated with the type of the lead vehicle 140. However, when block 250 is reached from the check at block 230, the desired acceleration $\dot{\vartheta}_H(t)$ according to EQ. 2 is used to control operation of the host vehicle 100.

At block 260, updating the lag of the type of the lead vehicle 140 refers to updating $\tau_{acc}$ and $\varphi_{acc}$ or $\tau_{acc}$ and $\varphi_{dec}$ based on whether the scenario involves the lead vehicle 140 increasing or decreasing its speed. The updating is based on the actual gap g that resulted from the processing at block 240 and the implementation at block 250 (of the modified desired acceleration $a_{est}$) in comparison with the desired gap g*. That is, the lag time constant t and the delay constant $\varphi$ may be adjusted in the look-up table for the entry associated with the type of the lead vehicle 140 if the actual gap g is less than or greater than the desired gap g* after the acceleration of the host vehicle 100 is based on considering the intended acceleration of the lead vehicle 140.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for operating a host vehicle, comprising:
    obtaining, by processing circuitry of the host vehicle, a velocity of a lead vehicle and a gap g between the host vehicle and the lead vehicle, wherein the lead vehicle is traveling ahead of the host vehicle;
    computing a perceived acceleration of the lead vehicle based on a change in the velocity of the lead vehicle, wherein the perceived acceleration of the lead vehicle differs from an intended acceleration of the lead vehicle commanded by a driver or controller of the lead vehicle by a lag between the intended acceleration and a response of the lead vehicle to the intended acceleration;
    computing, using the processing circuitry, a corresponding desired acceleration for the host vehicle using the perceived acceleration of the lead vehicle to maintain the gap g within a specified range of gap values;
    computing, using the processing circuitry, a modified desired acceleration for the host vehicle using the desired acceleration for the host vehicle and the lag for the lead vehicle;
    controlling the host vehicle by implementing the modified desired acceleration at the host vehicle to maintain the gap g; and
    updating the lag for the lead vehicle based on a comparison of the actual gap resulting from implementing the modified desired acceleration and the gap g.

2. The method according to claim 1, further comprising obtaining the measured velocity of the lead vehicle using a sensor, and the sensor includes a radar system, a lidar system, or a camera.

3. The method according to claim 1, wherein the computing the corresponding desired acceleration for the host vehicle includes determining a desired gap g* as:

$$g^* = g_0 + \max\left[0, \left(\vartheta_H T + \left(\frac{\vartheta_H \Delta\vartheta}{2\sqrt{a_H b}}\right)\right)\right],$$

where
    $g_0$ is a set minimum gap value, $\vartheta_H$ a current velocity of the host vehicle, T is a known constant related to a time associated with a safe gap, $\Delta\vartheta$ is a difference between a current velocity $\vartheta_L$ of the lead vehicle and the current velocity $\vartheta_H$ of the host vehicle, $\alpha_H$ is a current acceleration of the host vehicle, and b is a known constant that limits deceleration.

4. The method according to claim 3, further comprising computing the modified desired acceleration when the desired gap g* is outside the specified range of gap values.

5. The method according to claim 3, wherein the computing the corresponding desired acceleration for the host vehicle includes determining the desired acceleration $\dot{\vartheta}_H(t)$ for the host vehicle as:

$$\dot{\vartheta}_H(t) = a_H\left(1 - \left(\frac{\vartheta_H}{\vartheta_{Hf}}\right)^\delta\right) - a_H\left(\left(\frac{g^*(\vartheta_H \Delta\vartheta)}{g}\right)^2\right),$$

where
    $\vartheta_{Hf}$ is a final velocity of the host vehicle needed to achieve the desired gap g*, and g is a current gap.

6. The method according to claim 5, further comprising determining if a difference between a current acceleration of the host vehicle and the corresponding desired acceleration is within a specified range.

7. The method according to claim 5, further comprising determining a vehicle type for the lead vehicle and computing the modified desired acceleration of the host vehicle using:

$$\alpha_{est} = \dot{\vartheta}_H(t)(1-e^{(t-\varphi)\tau}),$$

where $\tau$ is a lag time constant for the vehicle type and $\varphi$ is a delay constant for the vehicle type and $\tau$ and $\varphi$ are obtained from a look-up table.

8. The method according to claim 7, wherein the modified desired acceleration of the host vehicle is computed by adding one or more model-based factors to $\alpha_{est}$.

9. The method according to claim 8, wherein the model-based factors include an acceleration factor statistical model of slowdown of the lead vehicle and a smoothness factor.

10. The method according to claim 7, further comprising updating the look-up table for the type of the lead vehicle based on a result of the implementing the corresponding desired acceleration at the host vehicle.

11. A system in a host vehicle, the system comprising:
one or more sensors configured to measure a velocity of a lead vehicle and a gap g between the host vehicle and the lead vehicle ahead of the host vehicle; and
a controller configured to:
compute a perceived acceleration of the lead vehicle based on detecting a change in the velocity of the lead vehicle, wherein the perceived acceleration of the lead vehicle differs from an intended acceleration of the lead vehicle commanded by a driver or controller of the lead vehicle by a lag between the intended acceleration and a response of the lead vehicle to the intended acceleration;
compute a corresponding desired acceleration for the host vehicle using the perceived acceleration of the lead vehicle to maintain the gap g within a specified range of gap values;
compute, a modified desired acceleration for the host vehicle using the desired acceleration for the host vehicle and the lag for the lead vehicle;
control the host vehicle to implement the modified desired acceleration at the host vehicle to maintain the gap g; and
update the lag for the lead vehicle based on a comparison of the actual gap resulting from implementing the modified desired acceleration and the gap g.

12. The system according to claim 11, wherein the one or more sensors include a radar system, a lidar system, or a camera.

13. The system according to claim 11, wherein the controller is configured to compute the corresponding desired acceleration for the host vehicle by determining a desired gap g* as:

$$g^* = g_0 + \max\left[0, \left(\vartheta_H T + \left(\frac{\vartheta_H \Delta \vartheta}{2\sqrt{a_H b}}\right)\right)\right],$$

where
$g_0$ is a set minimum gap value, $\vartheta_H$ is a current velocity of the host vehicle, T is a known constant related to a time associated with a safe gap, $\Delta\vartheta$ is a difference between a current velocity $\vartheta_L$ of the lead vehicle and the current velocity $\vartheta_H$ of the host vehicle, $\alpha_H$ is a current acceleration of the host vehicle, and b is a known constant that limits deceleration.

14. The system according to claim 13, wherein the controller is configured to compute the modified desired acceleration when the desired gap g* is outside the specified range of gap values.

15. The system according to claim 13, wherein the controller is configured to compute the corresponding desired acceleration for the host vehicle by determining the desired acceleration $\dot{\vartheta}_H(t)$ for the host vehicle as:

$$\dot{\vartheta}_H(t) = a_H\left(1 - \left(\frac{\vartheta_H}{\vartheta_{Hf}}\right)^\delta\right) - a_H\left(\left(\frac{g^*(\vartheta_H \Delta\vartheta)}{g}\right)^2\right),$$

where
$\vartheta_{Hf}$ is a final velocity of the host vehicle needed to achieve the desired gap g*, and g is a current gap.

16. The system according to claim 15, wherein the controller is configured to determine if a difference between a current acceleration of the host vehicle and the corresponding desired acceleration is within a specified range.

17. The system according to claim 15, wherein the controller is configured to determine a vehicle type for the lead vehicle and compute the modified desired acceleration of the host vehicle as:

$$\alpha_{est} = \dot{\vartheta}_H(t)(1-e^{(t-\varphi)\tau}),$$

where $\tau$ is a lag time constant for the vehicle type and $\varphi$ is a delay constant for the vehicle type and $\tau$ and $\varphi$ are obtained from a look-up table.

18. The system according to claim 17, wherein the controller is configured to compute the modified desired acceleration of the host vehicle by adding one or more model-based factors.

19. The system according to claim 18, wherein the model-based factors include an acceleration factor statistical model of slowdown of the lead vehicle and a smoothness factor.

20. The system according to claim 17, wherein the controller is configured to update the look-up table for the type of the lead vehicle based on a result of implementing the new corresponding desired acceleration for the host vehicle.

* * * * *